(12) United States Patent
Corlett et al.

(10) Patent No.: US 10,424,005 B2
(45) Date of Patent: Sep. 24, 2019

(54) METHODS, SYSTEMS, AND COMPUTER READABLE MEDIA FOR MANAGING ORDER PROCESSING AND FALLOUT IN AN ORDER MANAGEMENT SYSTEM

(71) Applicant: Oracle International Corporation, Redwood Shores, CA (US)

(72) Inventors: Marc John Corlett, Bolton (CA); Sandra Rolanda Leung, Toronto (CA); Brian James Dueck, Collingwood (CA); David MacDonald, Newmarket (CA); Daniel Hotung Ho, Thornhill (CA); Xuan Ju, Richmond Hill (CA); Robert John McArthur, Toronto (CA); Kenny Kai Tai Yan, Nepean (CA)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 654 days.

(21) Appl. No.: 14/700,819

(22) Filed: Apr. 30, 2015

(65) Prior Publication Data
US 2016/0321739 A1 Nov. 3, 2016

(51) Int. Cl.
*G06Q 30/06* (2012.01)
*G06Q 10/06* (2012.01)

(52) U.S. Cl.
CPC .................. *G06Q 30/0635* (2013.01)

(58) Field of Classification Search
USPC ............... 705/26.81, 7.25; 707/609
See application file for complete search history.

(56) References Cited

U.S. PATENT DOCUMENTS

| 7,096,189 | B1 * | 8/2006 | Srinivasan | G06Q 10/06315 |
| | | | | 705/7.25 |
| 2005/0289013 | A1 * | 12/2005 | Goldberg | G06Q 10/06311 |
| | | | | 705/7.13 |
| 2013/0226866 | A1 * | 8/2013 | Sebastian | G06F 16/21 |
| | | | | 707/609 |

OTHER PUBLICATIONS

Oracle Communications Unified Inventory Management, Oracle Data Sheet, http://www.oracle.com/us/industries/communications/045545.pdf, pp. 1-5 (2012).

* cited by examiner

*Primary Examiner* — Fahd A Obeid
*Assistant Examiner* — Reva R Danzig
(74) *Attorney, Agent, or Firm* — Jenkins, Wilson, Taylor & Hunt, P.A.

(57) ABSTRACT

Methods, systems, and computer readable media for managing order processing and fallout are disclosed. One exemplary method includes processing, in accordance to an orchestration plan, an order entity containing an order item, wherein the orchestration plan is functioning on a processing layer executed by electronic order management system. The method further includes respectively receiving, from each of one or more orchestration order components associated with the orchestration plan, state information corresponding to a child order item contained in a child order entity, wherein the state information respectively received by each of the one or more orchestration order components is respectively reflected in an order component order item included within the one or more orchestration order components and determining a current processing state for the order item by aggregating the state information reflected in all of the order component order items.

17 Claims, 4 Drawing Sheets

METHODS, SYSTEMS, AND COMPUTER READABLE MEDIA FOR MANAGING ORDER PROCESSING AND FALLOUT IN AN ORDER MANAGEMENT SYSTEM

TECHNICAL FIELD

The subject matter described herein relates to a computerized order management system. More particularly, the subject matter described herein relates to methods, systems, and computer readable media for managing order processing and fallout in an order management system.

BACKGROUND

At present, computerized order management systems are being employed in a number of industries to conduct order entry and order fulfillment tasks. For example, order entry may involve the process of electronically receiving orders and entering the orders into an order management system. Notably, the entered orders may be stored as order entities or records within the order management system for subsequent electronically fulfillment. In many instances, orders can contain data regarding one or more products (e.g., goods and/or services), technical actions and/or network commands to implement the one or more products, pricing information of the one or more products, and offers related to the one or more products. In some instances, computerized order management systems may generate an orchestration plan for each order. An exemplary orchestration plan may include information specifying functions for fulfilling an order, information for managing the sequence of those functions, and/or information for managing relational links between those functions. For example, an orchestration plan may include order elements (e.g., actions, items, tasks, and/or groups of items and/or tasks) that represent individual products, services, and/or offers that need to be fulfilled in series and/or in parallel and, thus, may include state information that is indicative of the relational link between these order elements. Notably, the state of order content/items during processing in the orchestration plan can be handled by custom calculations that cannot be relied on for system behavior decisions and is typically not reflected at the line item level of an order. Such unreliability can present inefficiencies in managing and monitoring the lifecycle of an electronic order entity existing at multiple hierarchal levels of a particular order management system.

Accordingly, there exists a need for systems, methods, and computer readable media for managing order processing and fallout in an order management system.

SUMMARY

Methods, systems, and computer readable media for managing order processing and fallout are disclosed. According to one exemplary method, the method occurs at an order management server that implements an electronic order management system. The order management server includes at least one processor and a memory. The method includes processing, in accordance to an orchestration plan, an order entity containing an order item, wherein the orchestration plan is functioning on a processing layer executed by electronic order management system. The method further includes respectively receiving, from each of one or more orchestration order components associated with the orchestration plan, state information corresponding to a child order item contained in a child order entity, wherein the state information respectively received by each of the one or more orchestration order components is respectively reflected in an order component order item included within the one or more orchestration order components. The method also includes determining a current processing state for the order item contained in the order entity by aggregating the state information reflected in all of the order component order items included in the one or more order components of the orchestration plan.

According to one exemplary system, the system includes at least one processor and a memory. The system also includes an order management server that implements an electronic order management system. The order management server is configured to process, in accordance to an orchestration plan, an order entity containing an order item, wherein the orchestration plan is functioning on a processing layer executed by electronic order management system, respectively receive, from each of one or more orchestration order components associated with the orchestration plan, state information corresponding to a child order item contained in a child order entity, wherein the state information respectively received by each of the one or more orchestration order components is respectively reflected in an order component order item included within the one or more orchestration order components, and determine a current processing state for the order item contained in the order entity by aggregating the state information reflected in all of the order component order items included in the one or more order components of the orchestration plan.

The subject matter described herein may be implemented in hardware, software, firmware, or any combination thereof. As such, the terms "function", "engine", "node" or "module" as used herein refer to hardware, software and/or firmware components for implementing the feature(s) being described. In one exemplary implementation, the subject matter described herein may be implemented using a non-transitory computer readable medium having stored thereon computer executable instructions that when executed by the processor of a computer cause the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for managing order processing and fallout in an order management system. In accordance with some aspects of the subject matter described herein, methods, mechanisms, and/or techniques for supporting hierarchical relationships existing between different instances of an order entity processed at different layers of the order management system. The present subject matter further includes a set of features that define a capability for an order management system to track the processing state of individual and/or aggregated order content during the execution of dynamic orchestration. Notably, the capability may be leveraged to support the detection and resolution of failed orders being processed in the order management system. In particular, the present subject matter affords the ability to assess a true state of the order content as the order entity is being contemporaneously processed at multiple layers of the order management system. In some embodiments, these order instances processed on each of the multiple layers may be related through metadata that establishes a relational link (e.g., a cross-reference) between two or more order instances. Based on the results of network and activation tasks conducted on behalf of these order entities, the order management system may record important event data and/or status information to update the processing state information of an associated item included in an order entity. Notably, the order management system may distribute the state information, which cascades in reverse direction up the hierarchy layers of the order management system, to keep all related orders (e.g., parent orders, ancestor orders, etc.) informed of the status. In contrast, disrupting the relational links in the order management system hierarchy by manually introducing new partial orders to remedy order failures is highly impractical and labor intensive to implement due to the nature of managing order lifecycles across a multi-layered order management system.

In some embodiments, an order management system or a related entity may generate an orchestration plan for fulfilling or completing an order. For example, an orchestration plan may include a plurality of order components (e.g., data constructs representing actions or groups of actions) for completing an order and dependencies, such as related child orders (e.g., descendent orders) and parent orders (e.g., ancestor orders). To efficiently support real-world order scenarios, various dependency relationships between order components may be utilized. In particular, an order management system or a related entity may utilize relational links established by order components of the orchestration plans that enable different instances of an original order entity submitted by a customer to be respectively executed in parallel by different layers or roles of the order management system.

In some embodiments, the relational link between related order entities may be utilized to communicate state information metadata between order components entities operating at different order management system layers. In many instances, upon receipt of important event and status information use to update their respective processing state information, order components may communicate the state information in a reverse direction up the order hierarchy in order to keep 'ancestor orders' (e.g., orders being processed at a preceding layer) at each of the order management system layer informed of child order status. Conversely, breaking the established relationships between the order components in the order hierarchy by manually introducing new partial orders into the hierarchy to remedy a detected failure, for example, is highly impractical because the processing of the new partial order introduces technical difficulties and cost inefficiencies within the order lifecycles supported across a multi-layered order management system solution.

Reference will now be made in detail to exemplary embodiments of the presently disclosed subject matter, examples of which are illustrated in the accompanying drawings. Wherever possible, the same reference numbers will be used throughout the drawings to refer to the same or like parts. Various embodiments of the present subject matter are disclosed and described herein.

Figure 1:
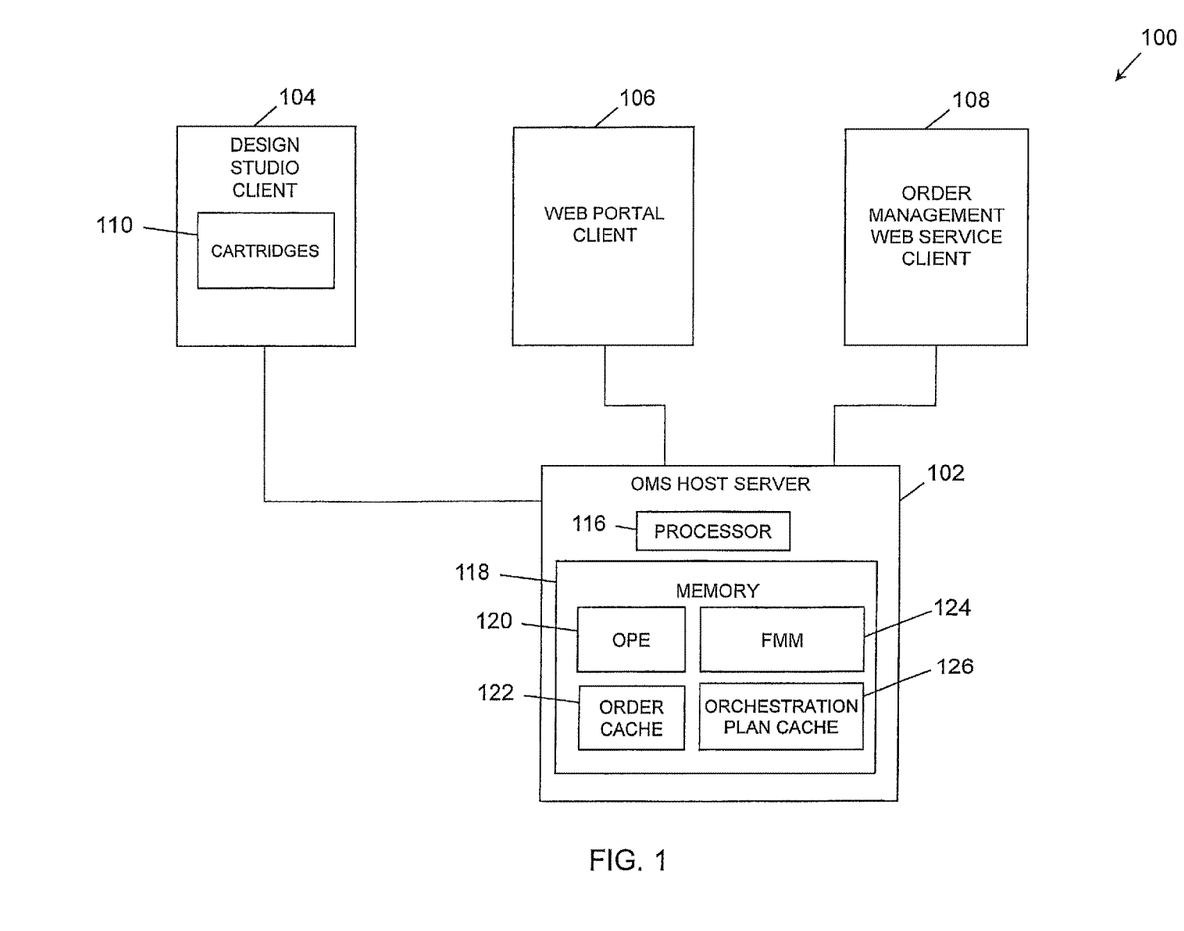
FIG. 1 is a block diagram illustrating an exemplary architecture for order management system according to an example of the subject matter described herein.

FIG. 1 is a block diagram illustrating an exemplary architecture for an order management system (OMS) 100 according to an example of the subject matter described herein. Referring to FIG. 1, OMS 100 may include an OMS host server 102 that is communicatively connected to each of a design studio client 104, at least one web portal client 106, and an order management web service client 108. Notably, each of OMS host server 102 and clients 104-108 may comprise a special purpose computer device or machine that includes hardware components (e.g., one or more processor units, memory, and network interfaces) configured to execute software elements (e.g., applications, cartridges, modules, etc.) for the purposes of performing one or more aspects of the disclosed subject matter herein. In addition, it should be noted that OMS host server 102 and its components and functionality described herein constitute a special purpose computer that improves the technological field pertaining to order management systems by providing mechanisms for managing and monitoring related order entities being respectively processed at different layers of an order management system (e.g., via order components and/or orchestration plans). It will be appreciated that FIG. 1 is for illustrative purposes and that various nodes, their locations, and/or their functions described above in relation to FIG. 1 may be changed, altered, added, or removed. For example, some nodes and/or functions may be combined into one entity as shown in FIG. 1 or distributed among a plurality of entities/devices.

In some embodiments, design studio client 104 includes an OMS client machine that is provisioned with one or more cartridges 110. In particular, design studio client 104 may be configured to design and generate one or more cartridges 110 (e.g., software-based cartridges executable on one or more processors) that are compatible with an OMS host server. For example, cartridges 110 may include an order-to-activate (O2A) cartridges for performing various tasks and/or storing metadata associated with order-to-activate process in OMS 100, e.g., processing from order creation to service activation. In this example, O2A cartridge may include OMS configuration data that includes product specification definitions including fulfillment metadata (e.g., dependency relationships) and order line item data that can be used to generate orchestration plans. As used herein, cartridges 110 generated by design studio client 104 may include any software package, application, or module that is executable by a host server and contains configuration data that defines various policies (e.g., remedial operations and rules) for managing and/or generating orchestration plans associated with customer orders. Notably, the configuration data and associated metadata enables a recipient host server, such as OMS host server 102, to process, manage, and execute orders and/or generate and execute orchestration plans at multiple order management system layers in accordance with defined policies. For example, an OMS host server may utilize the cartridges to execute order components included in a designed orchestration plan, wherein the order components utilize the line items of an order as input for execution. After generating cartridges 110, design studio client 104 may be further configured to send cartridges 110 to OMS host server 102 for provisioning.

As indicated above, OMS 100 may further include OMS host server 102, which is communicatively connected (e.g., via a local network or the Internet) to each of OMS clients 104-108. OMS clients 104-108 may represent various client entities that allow OMS operators or other users to communicate with OMS 100 or entities therein. For example, OMS clients 104-108 may allow users to send orders or related information to OMS host server 102 for order processing. In some embodiments, OMS host server 102 may include a processor 116 (which may be operatively coupled to a bus) for processing information and executing instructions or operations. Processor 116 may be any type of processor, such as a central processing unit (CPU), a microprocessor, a multi-core processor, and the like. OMS host server 102 further includes a memory 118 for storing information and instructions to be executed by processor 116. In some embodiments, memory 118 may comprise one or more of random access memory (RAM), read only memory (ROM), static storage such as a magnetic or optical disk, or any other type of machine or non-transitory computer-readable medium. OMS host server 102 may further include a communication device (not shown), such as a network interface card or other communications interface, configured to provide communications access to clients 104-108. In some embodiments, memory 118 may be utilized to store an order processing engine (OPE) 120, order cache 122, a failure management module (FMM) 124, and an orchestration plan cache 126.

In some embodiments, OMS host server 102 may receive one or more electronic sales orders submitted from a client entity (e.g., OMS clients 106-108), either directly from the client entity or via an order capture. For example, the received orders may comprise one or more sales orders that specifies one or more products and/or services (e.g., telecommunications services, network services, wireless communications services, etc.) requested by the client entity and/or customer. In some embodiments, order management web service client 108 may operate as an order capture system that comprises a computer system configured to receive sales orders submitted by requesting client entities and to subsequently forward customer orders (based on the aforementioned sales orders) to OMS host server 102 for processing. OMS host server 102 may then be configured to utilize OPE 120 to process the received electronic sales orders from the client(s). In some embodiments, OPE 120 may represent any suitable entity or entities (e.g., a computing platform, software executing on a processor, a logic device, an ASIC, and/or an FPGA) for processing orders. For example, OPE 120 may be configured to process and manage several heterogeneous types of orders (i.e., different types of orders) stored in order cache 122. In some embodiments, OPE 120 may comprise a software algorithm (executable by one or more processors) that is configured to receive and process various types of orders. In some embodiments, OPE 120 may generate a customer order in response to the receipt of a sales order submitted by a customer via any client operating in a customer relations management (CRM) system (see FIG. 2 below for more detail).

In some embodiments, orchestration plan cache 126 may represent any suitable entity (e.g., a storage device or memory) for storing order fulfillment metadata and/or orchestration plans associated with cartridges 110 (e.g., O2A cartridge). For example, an orchestration plan may be a static and/or predefined orchestration plan based on metadata, dependencies, and/or other information in cartridges 110. In some embodiments, orchestration plan cache 126 may include a number of orchestration plans, where each modeled orchestration plan may represent an idealized order fulfillment plan with dependencies between order components based on exemplary orders for tasks, services, or offers defined in cartridges 110. Similarly, orchestration plan cache 126 may also be configured for storing both model orchestration plans and run-time orchestration plans (and/or related information). For example, a run-time orchestration plan may be a dynamic orchestration plan based on a model orchestration plan. In some embodiments, orchestration plan cache 126 may contain orchestration plans for any type of electronic order including, but not limited to customer orders, provisioning orders, billing orders, shipping orders, and inventory orders.

As used herein, dynamic orchestration is a mechanism by which the content of the order (e.g., order items or line items) may be delivered to a customer through one or more related orchestration plans. However, the utilization of a plurality of related orchestration plans that are operating at different layers of the order management system can present additional challenges in tracking the processing state, failures (e.g., failed tasks), and correction of order content being delivered via dynamic orchestration. As indicated above, order content managed via dynamic orchestration allows an order item (or line item) to exist on multiple order components in a parallel fashion as set forth by the generated orchestration plan(s). For example, the same order item may simultaneously exist on different order components (e.g., a provisioning order component, a billing order component, and a shipping order component) supported by an orchestration plan. Notably, this configuration can result in the order line item having a different state for each of the various order components. Accordingly, the state information for a particular order line item being processed by a multilayer order management system should be aggregated in a manner that reflects state information that consistently considers all layers of the order management system (e.g., see FIG. 2 below for an illustration).

In some embodiments, OMS host server 102 may initially store the received sales orders from the customers in a data storage unit, such as a database (not shown). Afterwards, OMS host server 102 may utilize OPE 120 to access the data storage unit to retrieve and store the sales orders in memory 118 (e.g., order cache 122). The orders contained in order cache 122 may then be converted into at least one customer order processed by OPE 120 in accordance with relevant orchestration plans and/or using rules and policies set forth in cache 126. In some embodiments, order cache 122 may contain any type of electronic order including, but not limited to customer orders, provisioning orders, billing orders, shipping orders, and inventory orders. Order cache 122 may also include customer orders, service order management orders (i.e., SOM orders), technical order management (TOM) orders, activation orders, and/or other orders managed and processed by OMS host server 102.

In some embodiments, OPE 120 and/or another related entity (e.g., OMS host server 102) may generate an orchestration plan by determining one or more actions in a sequence to be used to complete an order. For example, OMS host server 102 may determine the requirements of an order and may identify order components (e.g., one or more processes, tasks, actions, and/or various groupings therein)

for fulfilling these requirements. In this example, OMS host server 102 may also determine an appropriate sequence for performing these order elements and may also determine one or more dependency relationships between these order components.

For example, an orchestration plan may be for fulfilling a broadband Internet service order. In this example, the orchestration plan may include a sequence of order components 'A', 'B', and 'C', where each order component includes at least one order component order item (OCOI), which may represent a task or action to be performed. Continuing with this example, order component 'A' may represent a task for shipping user equipment (e.g., a broadband modem) to the customer, order component 'B' may represent a task for installing the user equipment, and order component 'C' may represent a task for activating user equipment.

In some embodiments, OPE 120 and/or another related entity (e.g., OMS host server 102) may generate an orchestration plan. For example, OPE 120 may generate an orchestration plan based on metadata rules that are configured to analyze the content of an order entity. Such metadata rules may be stored in any database accessible to OPE 120. Accordingly, orchestration plans utilized by OPE 120 and/or OMS host server 102 are generated based on the contents of the order entity (e.g., order line items and/or order line item properties) and are not predefined. In this example, after generating an orchestration plan, OPE 120 may utilize the orchestration plan to execute fulfillment tasks for completing the customer order and may subsequently store the executed orchestration plan in cache 126.

In some embodiments, OPE 120 and/or another related entity (e.g., OMS host server 102) may support the management and monitoring of various hierarchal relational links existing among order entities supported by among order components in an orchestration plan. For example, OPE 120 may designate that two order items are associated using a relational link included in metadata associated with the order components. More specifically, OPE 120 may support relational links for orders processed by an orchestration plan by maintaining state information for each order item processed by order components in the orchestration plan. For example, OPE 120 may maintain a state flag or value for each order item in a local database in OMS host server 102. The state flag or value may include a binary numeral that is indicative of one of a plurality of order item states, such as described below and illustrated in FIG. 3.

Figure 2:
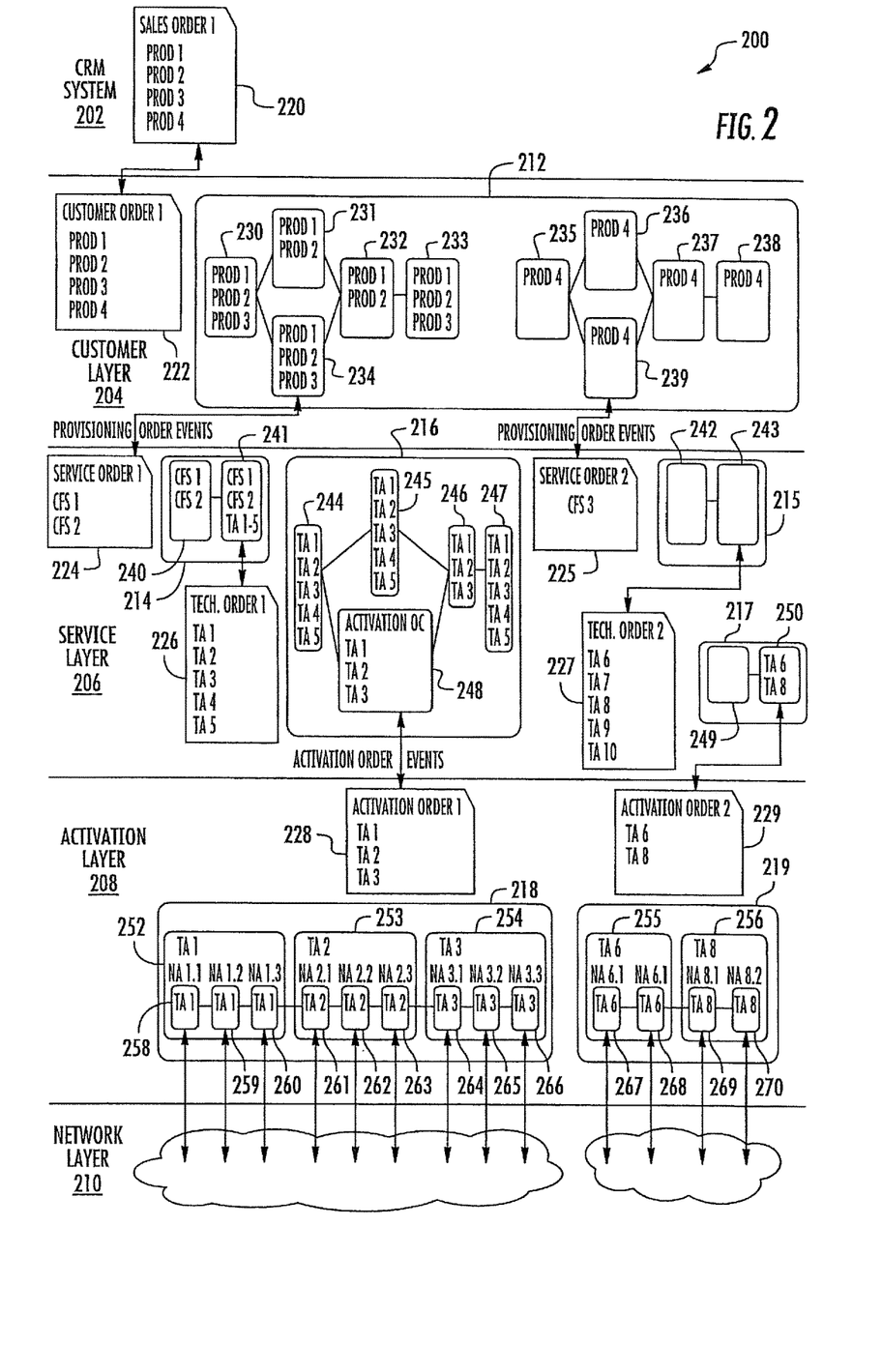
FIG. 2 is a diagram illustrating exemplary layers of an order management system configured to process order entities according to an example of the subject matter described herein.

FIG. 2 is a diagram illustrating exemplary layers or roles of an order management system 200. Specifically, FIG. 2 depicts a logical illustration of a model of an order management system solution configured to support electronic order processing and the management of order fallout. In some embodiments, the existing order management system may utilize an order management processing model that can be deployed to function in a number of processing layers or roles, including a customer layer 204 (e.g., a customer order management layer), a service layer 206 (e.g., a service order management layer and/or a technical order management layer), and an activation layer 208 in order to process orders in parallel among a plurality of order management system layers. Further, layers 204-208 may be logically represented in FIG. 2 in such a manner that the layers may be referenced to each other with respect to a logical hierarchy. For example, service layer 206 can be considered as a 'previous processing layer' to activation layer 208. Similarly, for example, service layer 206 may be considered as a 'subsequent processing layer' to customer layer 204.

As shown in FIG. 2, a customer may submit (e.g., via a client in customer relationship management system 202) a sales order 220 to an OMS host server (e.g., host server 102 shown in FIG. 1) for a low-tier broadband Internet service line, VoIP service line, a VoIP mailbox server line, and cable television service. These services may be respectively represented as "Prod 1"—"Prod 4" in sales order 220. Although not shown in FIG. 2, other exemplary services that may be requested include, but not limited to, a fast-tier Internet service line, an email service line, a VoIP CPE line, a VoIP mailbox server line, a PSTN service line, and the like. FIG. 2 further illustrates a customer order management layer 204 of the hierarchy established by OMS host server 102 that may generate a customer order 222 (based on sales order 220) that contains the requested products and/or services. Notably, customer order management layer 204 includes an orchestration plan 212 that includes a plurality of order components 230-239. In some embodiments, the orchestration plan is generated by OPE 120 (shown in FIG. 1) based on metadata rules that analyze the content (e.g., order line items and/or line item properties) of customer order 222 and the order components are generated based on the policies of orchestration plan 212. Notably, order components 230-239 operate as provisioning fulfillment functions in the event submitted customer order 222 is processed. As depicted in FIG. 2, order components 230-234 collectively represent a first group of order components belonging to orchestration plan 212 that that are used to generate a service order 224 for a first product/service while order components 235-239 collectively represent a second group of order components belonging to orchestration plan 212 that are used to generate a second service order 225 for a second product/service associated with customer order 222.

As shown in FIG. 2, order component 234 issues a request for services by generating and submitting a service order 224 that includes 'customer facing service (CFS) 1' and 'CFS 2' to orchestration plan 214 in service management layer 206. In some embodiments, OPE 120 executes a layer specific cartridge (e.g., a service layer cartridge) that defines processing logic that, when executed, establishes one or more functions and/or tasks to manage the operation of the service layer 206. For example, OPE 120 may utilize the service layer cartridge logic to receive service order 224, decompose the received service order 224 (e.g., extract order item content contained within), and generate an orchestration plan 214 including order components 240-241 based on the content (i.e., order items 'CFS 1' and 'CFS 2') of service order 224. For example, orchestration plan 214 may generate an order component 240 including 'CFS 1' and 'CFS 2' and a second order component 241 that includes 'CFS 1' and 'CFS 2' along with technical actions (TAs) 1 through 5.

In some embodiments, OPE 120 (as shown in FIG. 1) may be configured to create a relational link between customer order 222, which exists on the customer management layer 204, and service order 224, which exists on the service management layer 206. In some embodiments, relationships (e.g., a relational link) between orders may be managed through relational dependencies that are based on data. For example, a customer order may have dependencies to one or more service orders, meaning that the customer order cannot progress beyond a particular order component until the one or more dependent service orders are complete (or reached a particular milestone). In some embodiments, the relational links are stored in a database accessible to OMS host server 102 (e.g., a local database or an external database). In some embodiments, the relational link information may be maintained in a cache or data storage medium in OMS host server 102.

Alternatively, the relational link information may be recorded as metadata in the order entity itself. In some embodiments, the relational information may be a relational link identifier that comprises one or more pieces of data on the order entity representing an order key for the linked order. The relational link identifier links the order at an upper layer to the related orders it generates on a subsequent/lower layer (e.g. a customer order that generates one or more service orders). The one or more pieces of data representing the order key may remain immutable in such a manner that a logical link is preserved throughout the lifecycle of the aforementioned related orders, including across revisions. In some embodiments, a common identifier of data may be carried on the order that can include the unique identifier from the original inbound order at the top-most layer and may be leveraged to allow users to search for all orders at all layers that are related to that top-most order. For example, OPE 120 may set a relational link identifier that is common in both customer order 222 and service order 224. In some embodiments, the relational link identifier may comprise a linked list or a pointer that provides data that allows a user or the OPE 120 to identify, monitor, and/or access a related order. Alternatively, there exists different configurable strategies for defining the manner in which users can view multiple related orders.

Continuing with the illustration depicted in FIG. 2, service order 224 may initiate the generation, via a call to a service inventory system, a technical order 226 containing TA1 - TA5 as its content. In some embodiments, OPE 120 may be triggered to initiate the generation of the technical order 226 upon the receipt of service order 224 by orchestration plan 214. Similarly, technical order 226, which is operating on a technical order management sub-layer in layer 206 may trigger OPE 120 to call an activate fulfillment function (e.g., one or more of activation order components 244-248 in orchestration plan 216) to send an activation order 228 including TA1-TA3 to activation layer 208. As in the manner indicated above, orders 226 and 228 may be associated to each other and orders 222 and 224 by using relational dependencies established by relational link information that is stored as metadata (e.g., in a database accessed by an OPE host server). Similarly, FIG. 2 depicts orchestration plans 215 and 217 which may include activation order components that may be used to generate technical orders and/or activation orders in the same manner described above with respect to orchestration plans 214 and 216. For example, orchestration plan 215 is depicted at including order components 242-243 and generating technical order 227. Similarly, orchestration plan 217 is depicted at including order components 249-250 and generating activation order 229, which is ultimately received and processed by orchestration plan 219.

Continuing with the illustration depicted in FIG. 2, activation order 228 is received by orchestration plan 218 and is processed by order components 252-254, which may respectively comprise network actions (NAs). In some embodiments, activation layer 208 utilizes TA-to-NA mappings (e.g., mappings stored as database entries in a data storage structure, such as a local database residing in the OMS host server or an external database that is located separately from the OMS host server, such as a database cluster environment) to generate the network actions to be used to configure and implement the requested services in the network. For example, a network action may include a communication to a customer's router device via a gateway element residing in network layer 210 to configure said router device to facilitate one or more of the requested products specified in customer order 222. FIG. 2 further depicts orchestration plan 219 in activation layer 208, which includes order components 255-256. Notably, activation order 229 may be processed via orchestration plan 219 in the same manner activation order 228 is processed by orchestration plan 218 as described herein.

As mentioned above, relational links between different order instances such as customer order 222, service order 224, technical order 226, and activation order 228 may be related using metadata, such as a relational link identifier. A similar relational link identifier may be similarly established among customer order 222, service order 225, technical order 227, and activation order 229. Furthermore, the order hierarchy of orders 222-229 and their relational links amongst layers 202-210 can be described in terms of ancestors and descendants used to represent a family tree. Notably, descendant orders are created from ancestor orders by one or more order components. For example, customer order 222 in customer layer 204 is the parent order of service order 224. Likewise, service order 224 is a child order of customer order 222. Technical order 226 is a child order of service order 224 as well as the parent of activation order 228. In addition, multiple child orders from the same parent order are sibling orders. For example, service orders 224 and 225 would qualify as sibling orders having customer order 222 as a parent.

In some embodiments, the fulfillment of an ancestor order is completed after its descendant orders have completed. For example, customer order 222 is i) the first order created at the customer layer (i.e., created in response to receipt of a sales order received into the customer layer and ii) the last order in the order hierarchy to be completed (i.e., all of its descendant/children orders need to be completed first). In contrast, activation orders (such as activation orders 228 and 229), which may be represented at a leaf-level in the order management system hierarchy, are completed before the completion of their parent and ancestor orders. For example, activation order 228 will complete before its ancestor orders, i.e., technical order 226, service order 224, and customer order 222, are completed.

In some embodiments, activation order 228 is executed linearly with a single line item per order component (e.g., see each of order components 258-266 in FIG. 2). Specifically, these order components (e.g., network actions) and their respective OCOIs (e.g., technical actions) are executed one at a time in a sequential manner. For example, OPE 120 may be configured to execute order components 258-260 in order such that order component 259 is not initiated until order component 258 is completed. In the event a response to a network action is received from the network layer 210, the associated result may be to that order components technical action. Notably, for example, a hard failure for a network action means that the technical action fails, and thus, that the order (i.e., activation order 228) has at least partially failed.

In some embodiments, the order items in the service management layer 206 (e.g., a service order management layer and/or technical order management layer) and customer management layer 204 may not necessarily be executed by OMS host server 102 (and/or OPE 120) in a linear manner and may have multiple order items per order component. For example, ancestor order items can be executed by the OPE 120 in accordance to order hierarchy. Specifically, when an order management system layer receives a response from a downstream order management system layer (e.g., via order components), the response and/or result may apply to one or more order items in one or more order components of the receiving order management system layer. Thus, each OCOI may have a different status or state result.

In some embodiments, the status of an order item of an order entity may be represented using an aggregated state that is determined based on the status of that order item as it is processed on multiple layers of the order management system. For example, the order management system may be configured to permit an order item of an order entity to have an aggregated state of 'Partially Failed' to reflect that at least one of the concurrent order components processing the order entity has encountered a failure. Such state information may be recorded in a database in OMS server 102 and/or in the order entity itself. Notably, such a dynamic also means that determining when an order (as opposed to an order item) has 'failed' is less straightforward, since some portions of the order entity may have failures while other portions of the order entity continue to execute. To address this dynamic, failure counts and warning counts are utilized by the order management system.

As shown in FIG. 2, order management system 200 is presently executing seven order instances that include customer order 222, service orders 224-225, technical orders 226-227, and activation orders 228-229). Since activation orders (e.g., activation order 228) are one leaf-level orders among many orders in the order hierarchy, any updates incorporated into the state of the ancestor/parent order items is an important consideration in the design approach for fallout management. As indicated above, these orders are typically related through solution metadata, such as a relational link identifier, that provides cross-references. In particular, any state information used to update OCOI state information may be cascaded by OPE 120 in reverse direction up the order hierarchy all the way to customer management layer 204 in order to keep the ancestor orders informed of status.

In one embodiment, a failure of a network action may be detected by OPE 120 via an order component (e.g., a technical action) in activation layer 208. For example, in the event a failure occurs associated with a technical action being facilitated by an external system residing in network layer 210 (e.g., a gateway fails to communicate), an order component may receive a response indicating the failed result from said external system. Upon receipt of the response, order component 218 may access a data structure that maps failure responses from external system to processing states (e.g., "Complete", "InProgress", "Failed", etc.) of the technical actions (i.e., order items) of activation order 228. Once the appropriate processing state is determined by OPE 120 using the mapped data structure (e.g., database), order component 218 may record the state information in the form of metadata to be included within order component 218 (e.g., metadata associated with failed OCOI technical action 2). In addition to recording this metadata, order component 218 (via execution by OPE 120) may subsequently forward the state information to an order component (e.g., order component 248) belonging to orchestration plan 216 in service layer 206 via messaging. In some embodiments, the communication of state information between orchestration plans and/or order components operating on different layers of order management system 200 may be conducted (e.g., facilitated by tasks and/or functions executed by OPE 120 processing one or more processing layer cartridges) via an asynchronous messaging service, such as a Java messaging service. In other embodiments, the messaging may be performed using any other enterprise application integration messaging service.

Upon receiving the state information, order component 248 may record and reflect the status information in an OCOI associated with the failed technical action (e.g., technical action 2). In this scenario, the OCOI associated with technical action 2 would utilize the received state information to indicate a failure that contributes to a failure count of order component 248. Some time after updating the status information, OPE 120 may assess the aggregated state information for technical action 2 on technical order 226. After ascertaining that the sum of failure counts for technical action 2 is greater than 0 (e.g., summing the failures in each order component in orchestration plan 216), OPE 120 may be configured to designate an InProgress (with Failures) to 'technical action 2' in technical order 226. Failure counts are described in further detail in FIG. 3 below In such embodiments, OPE 120 and/or another entity may manage the determination of order item failures using logic and/or other relevant information. In some embodiments, OPE 120 may utilize FMM 124 to determine the aggregated state and/or failure count for an order item while considering parent orders and child orders existing at different order management system layers. For example, OPE 120 may use logic included in FMM 124 for determining the sum of failures existing for an order item being processed by a plurality of OCOIs. Notably, OPE 120 may use FMM 124 keep track of failure count status information associated with interrelated order items existing at different layers of the order management system. Notably, FMM 124 (when executed by OPE 120) is configured to ensure that i) changes in order item states are aggregated correctly, ii) fallout operations are invoked at the correct time (e.g., order execution may be stopped and/or paused), and iii) subsequent correction operations can star to remedy problems and resume execution of a failed order.

Figure 3:
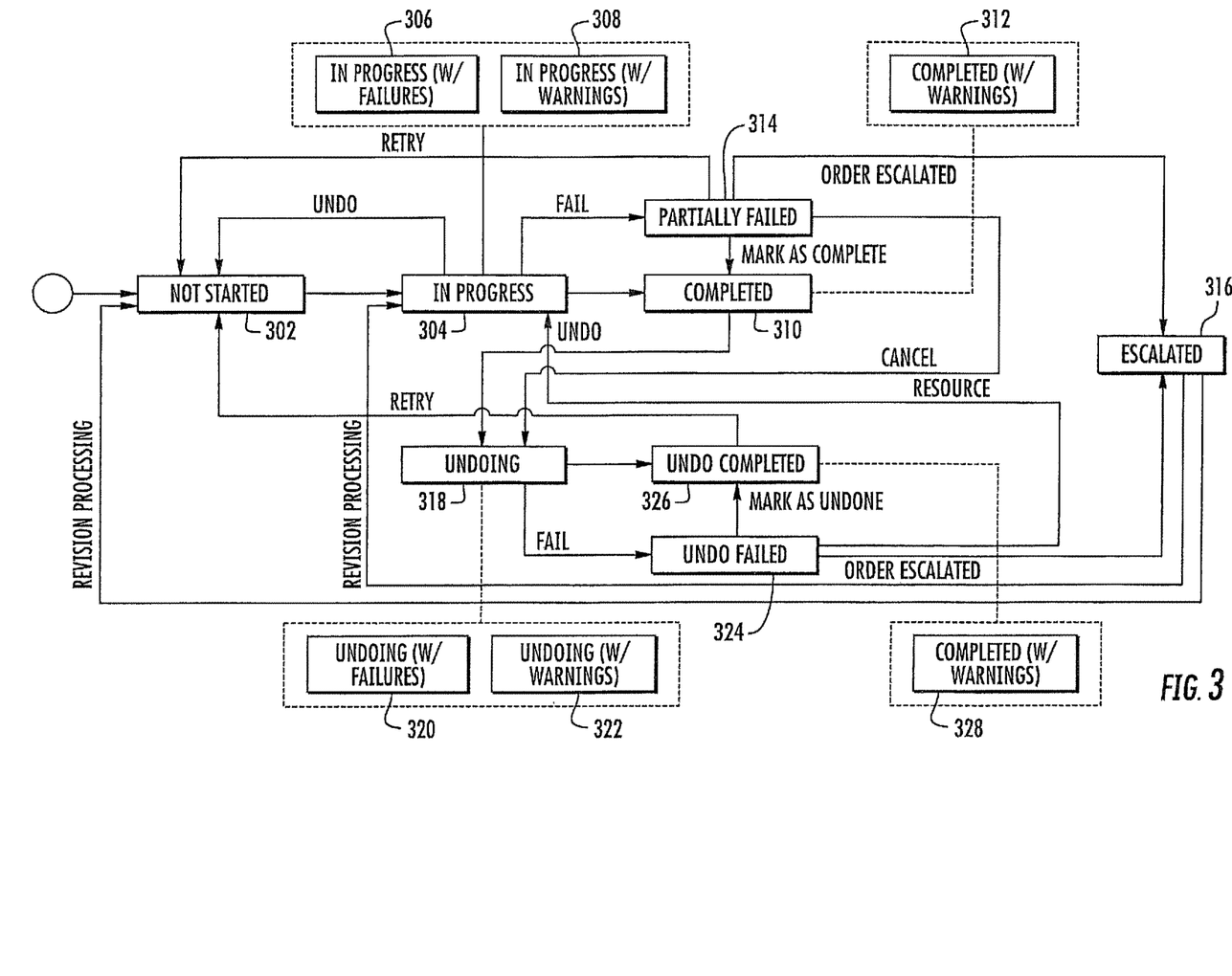
FIG. 3 is a diagram illustrating exemplary a state flow diagram of an exemplary order item according to an example of the subject matter described herein.

FIG. 3 is a diagram illustrating exemplary a state flow diagram of an exemplary order item according to an example of the subject matter described herein. Even in highly automated service fulfillment environments, orders can experience errors that can cause failures for any variety of reasons, such as bad or missing data, timeouts expiring on the order, network element configuration errors, and the like. As such, OPE 120 may be configured to detect errors upon occurrence, resolve order failures within the system layer that detected the fallout or error, and/or escalate order failures when the system layer is unable to resolve the order failure. Notably, these capabilities can be configured to function together when the order management system is employed in more than one layer (e.g., utilizing each of different layers 204-208). As such, order components may execute in parallel and may respectively include multiple order component order items (OCOIs). Notably, these OCOIs may exist and be executing on a plurality of order components in parallel and may reflect their own states to a related order item on the processed order instance being processed at that particular order management system layer. Generally, the order management system's existing order processing model facilitated by OPE 120 supports a number of processing states for both order items and OCOIs.

In some embodiments, an order item processing state can be influenced by i) an order component state, ii) an OCOI state, and/or iii) an order item fulfillment state, which includes business-rule based status information that is primarily reported to upstream order management system layers and/or instances. For example, exemplary order item processing states may include, but not limited to, i) Not-Started, ii) InProgress, iii) Completed, iv) PartiallyFailed, v) Escalated, vi) Undoing, vii) Undoing Failed, and vii) Undo-Completed. For example, FIG. 3 depicts a flow diagram of the various order item processing states and their relational dependencies. For example, Not Started state 302 represents a processing state where no order components associated with a particular order item (or any of its child order items) have been initiated or started by OPE 120. Not Started state 302 may serve as a starting point all order items to be processed by the order management system. Once processing of an order is initiated, InProgress state 304 may be used to indicate that an order item (i.e., itself or one of its child order items) is not in any of a NotStarted, Completed, or PartiallyFailed state.

Notably, if the order item has been started and has not finished, then the order item is in InProgress state 304. In some embodiments, InProgress state 304 may be associated with two subset states, InProgress (with Failures) state 306 and InProgress (with Warnings) state 308. Namely, InProgress (with Failures) state 306 is representative of an InProgress state in which either i) the failure count of the OCOI associated with the order item is greater than zero or ii) the sum of the order item's child order item (COI) failure count is greater than zero. For example, an order item's processing state is generally computed based on the processing states of its OCOIs and/or the processing states of its children order items. The order item will also contribute to the processing state of its own parent order item. Notably, the processing state of an order item is not directly influenced or determined based on its own parent order item. Likewise, InProgress (with Warnings) state 308 is representative an InProgress state in which either an associated parent order item's warning count is greater than zero or the sum of the order item's COI warning count is greater than zero.

As described herein, parts of an order may have failures while other parts of the order may continue to execute. To address this, failure counts (FCs) and warning counts (WCs) may be managed and recorded by OPE 120 (using FMM 124). As used herein, the failure count for an order item is the sum or total count of all 'Failed' OCOI results for the order item. Notably, the failure count for an order item's OCOI does not include the COI failure counts in order to avoid double-counting failures for failed order components on which both the order item's OCOI and the order item's COIs are present. Thus, an order item's OCOI may have a failure count that is less than the sum of failure counts for the order item's COIs. Similarly, a warning count for an order item is the count of all the "Warning" OCOI results for the order item. The warning count for an OCOI and COI is determined by OPE 120 (e.g., executing FMM 124) in a manner similar to the failure count described above.

Completed state 310 represents an order item state in which every component with this order item has returned a "succeed" result and all of the COI processing states are completed. Similarly, one subset of completed state 310 includes a Completed (w/Warnings) state 312 which may indicate that every component associated with the order item has returned a result of either 'Succeed' or 'Warning' and either the order item's warning count exceeds zero or the sum of its COI warning count is greater than zero.

PartiallyFailed state 312 is indicative of a state in which every order component associated with the order item has returned a result, and all of its COIs are in one of a Completed, Completed (with Warnings), Failed, or PartiallyFailed state. If no OCOI for the order item returned a Result of 'Fail', then at least one of its COI processing states is in the PartiallyFailed state. The Escalated state 316 indicates that the order has been escalated or forwarded to an entity that is capable of remedying the fallout condition. Generally, the Undoing state 318 is used to indicate the order item has been removed from the order and that the order item is being compensated to be removed from all processing activities. Additionally, the Undoing state 318 represents that i) the order item itself is not in a state of UndoCompleted, UndoCompleted (with Warnings), or UndoFailed or ii) at least one of the associated COI's processing states is not in a NotStarted, Completed, Completed (with Warnings), or Partially Failed state. Two subsets of Undoing state 318 include Undoing with Failures) state 320 and Undoing (with Warnings) 322. Undoing (with Failures) state 320 represents a state where the OI is in the Undoing state and either the order item's OCOI failure count is greater than 0 or the sum of the COIs failure count is greater than 0. Similarly, Undoing (with Warnings) state 322 represents a state where the order item is in the Undoing state and either the order item's OCOI warning count is greater than 0 or the sum of the order item's COI warning count is greater than 0. Further, UndoFailed state 324 represents an order item state where every component of the order item has returned a result and all of its COI processing states includes one of UndoCompleted, UndoCompleted (with Warnings), Undo-Failed, and PartiallyFailed. If no OCOI being undone for the order item itself returned a Result of 'Fail', then at least one of its COI's processing state is UndoFailed. UndoCompleted state 326 represents a state where every component with the order item has returned a result and all of its COI processing states are UndoCompleted. Similarly, UndoCompleted (with Warnings) state order item represents a state where every component undone with this order item has returned a Result of either 'Succeed' or 'Warning', and either warning count of this order item greater than 0 or the sum of its COI warning count is greater than 0.

Figure 4:
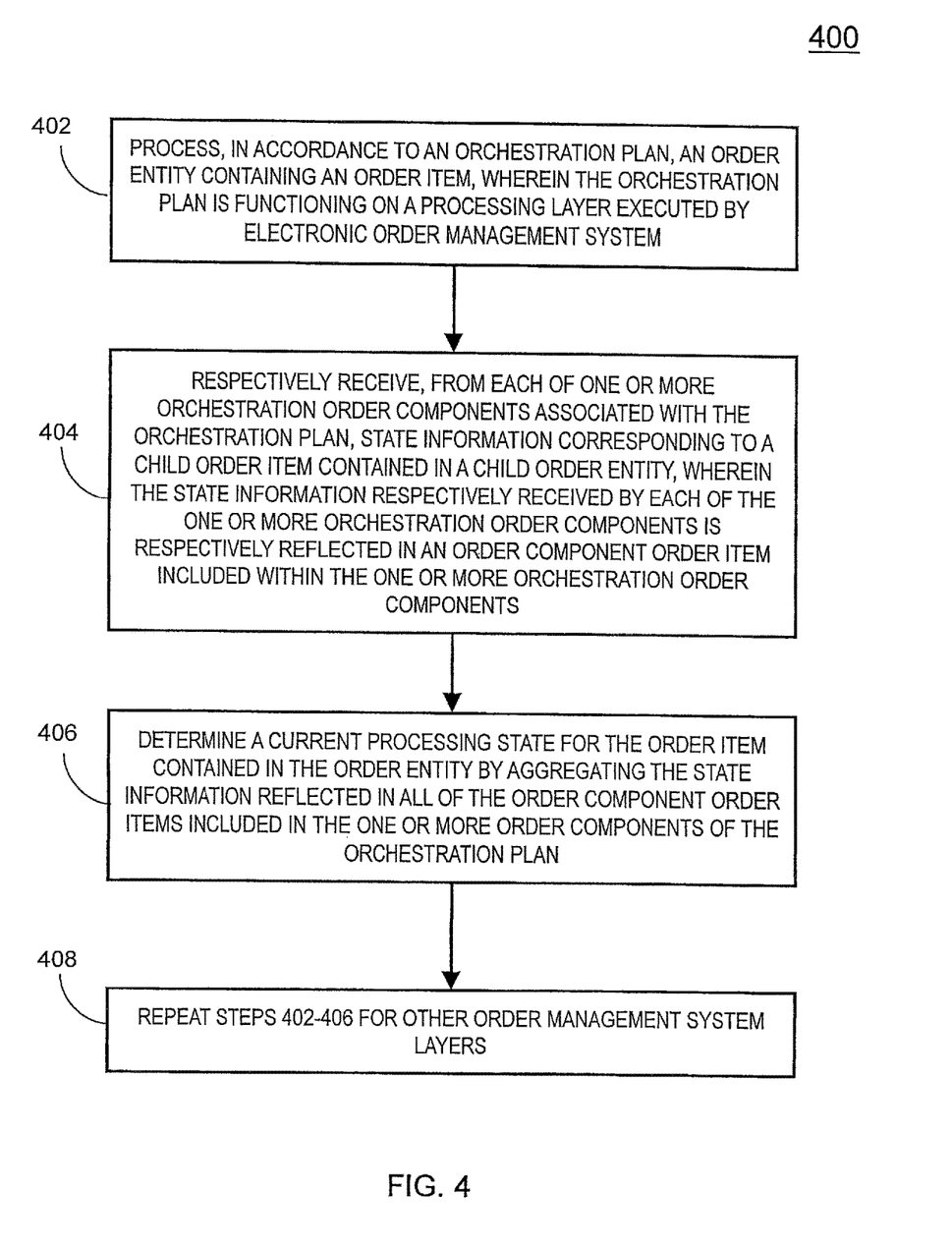
FIG. 4 is a flow chart illustrating an exemplary method for managing an order entity according to an example of the subject matter described herein.

FIG. 4 is a flow chart illustrating an exemplary process 400 for managing order processing and fallout according to an example of the subject matter described herein. For illustrative purposes and explanation, references to entities included in FIGS. 1-3 may be used below. In some embodiments, exemplary process 400, or portions thereof, may be performed by or at order management system 100, OPE 120, OMS host server 102, and/or another node, module, or entity. In some embodiments, exemplary process 400 may include steps 402, 404, 406, and/or 408.

At step 402, an order entity containing an order item is processed in accordance to an orchestration plan. In some embodiments, the orchestration plan is functioning on a processing layer executed by an electronic order management system. In some embodiments, an orchestration plan may be stored in memory 118 of OMS host server 102. Referring to FIG. 2 as an example, orchestration plan 216 in service management layer 206 may be executed by OPE 120 in OMS host server 102 to process technical order 226, which includes a plurality of technical actions (e.g., TA1-TA5). As a result, each of order components 244-248 may be configured to process one or more of the technical actions in technical order 226 and are represented as OCOIs. Activation order component 248, for example, comprises OCOIs that correspond to TA1, TA2, and TA3 only. Based on these OCOIs, order component 248 may generate an activation order 228 that is submitted to orchestration plan 218 in activation layer 208. Notably, the OPE may execute orchestration plan 218 to generate a single order component containing a single network action for each of the technical actions include in activation order 228. Each of the network actions in activation layer 208 are executed by the OPE 120 in sequential order.

At step 404, state information corresponding to a child order item contained in a child order entity is respectively received from each of one or more orchestration order components associated with the orchestration plan. In some embodiments, the state information respectively received by each of the one or more orchestration order components is respectively reflected in an order component order item included within the one or more orchestration order components. In some embodiments, order component 218 may periodically provide state information to order component 216. Similarly, each of order components 244-247 may respectively receive state information from orchestration plans and/or order components in activation layer 208 in a similar manner. In the event an order component or orchestration plan receives a response indicating a failure of network action (e.g., TA2.2) from an external system residing in network layer 210, OPE 120 may designate the state of the associated OCOI as "failed" and subsequently utilize a messaging service (e.g., Java messaging service) to communicate or forward the state information to order component 248 in service layer 206 (e.g., the 'previous processing layer'), which originally generated the related activation order 228. Notably, the "failed" state information is reflected and represented in the corresponding OCOI (i.e., TA2) in activation order 228. Additional communications may be respectively cascaded upwards in a similar manner by other order components in activation layer 208 to order components in orchestration plan 216 in the event of other independent failures.

At step 406, a current processing state for the order item contained in the order entity is determined by aggregating the state information reflected in all of the order component order items included in the one or more order components of the orchestration plan. In some embodiments, OPE 120 may determine the current processing state for an order item TA2 in technical order 226 by conducting the aggregation of all state information reflected in the OCOIs in orchestration plan 216 that are associated with TA2. For example, OPE 120 may determine the sum of failure counts existing in OCOIs corresponding to TA2. If the sum determined by OPE (via execution of the layer's cartridge) indicates that there are no failures, then OPE may assign a current processing state of order item TA2 to "Completed" or "InProgress". If OPE 120 ascertains that there is at least one instance of failure reflected in an OCOI, then the order item associated with TA2 in technical order 226 may be marked as "In Progress (with Failures)" or "Completed (with failures)".

At step 408, the determination of state information for an order item may be repeated for a logically preceding layer. In some embodiments, each of steps 402-406 described herein may be repeated in a similar manner with each of the orchestration plan(s) existing in the service order management sub-layer of layer 206 and customer order management layer 204.

It will also be appreciated that exemplary process 400 is for illustrative purposes and that different and/or additional actions may be used. It will also be appreciated that various actions associated with exemplary process 400 may occur in a different order or sequence.

It will be appreciated that OMS 100, OMS host server 102, OPE 120 and/or functionality described herein may constitute a special purpose computer. Further, it will be appreciated that OMS 100, OMS host server 102, OPE 120 and/or functionality described herein can improve the technological field pertaining to order management systems by providing mechanisms for supporting hierarchical relationships between order items of order entities processed at different layers of a multi-layered order management system.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for managing order processing and fallout, the method comprising:
    in an order management server that implements an electronic order management system, the order management server including at least one processor and a memory:
        processing, in accordance to a plurality of orchestration plans, an order entity containing an order item, each of the orchestration plans is functioning on one of a plurality of processing layers executed by the electronic order management system;
        respectively receiving, from each of one or more orchestration order components associated with the orchestration plans, state information corresponding to a child order item contained in a child order entity, wherein the state information respectively received by each of the one or more orchestration order components is respectively reflected in an order component order item included within the one or more orchestration order components; and
        determining a current processing state for the order item contained in the order entity by aggregating the state information reflected in all of the order component order items included in the one or more order components of the plurality of orchestration plans existing in the plurality of processing layers, wherein aggregating the state information includes determining a sum of processing failures corresponding to the order item and the child order item existing in the plurality of processing layers, wherein the order entity contains a relational link identifier that establishes a relational dependency between the order item existing at an upper layer of the plurality of processing layers and the child order item existing on a lower layer of the plurality of processing layers, wherein the relational link identifier contained in the order entity includes one or more pieces of data that remain immutable such that a logical link between the order item and the child order item is preserved throughout a lifecycle of the order item and the child order item.

2. The method of claim 1 wherein the plurality of processing layers includes a customer layer, a service layer, and an activation layer.

3. The method of claim 2 wherein each of the plurality of processing layers includes one or more orchestration plans containing one or more orchestration order components.

4. The method of claim 2 wherein the child order entity is processed on a subsequent processing layer positioned hierarchically below the processing layer in the order management processing model.

5. The method of claim 1 wherein the child order entity is generated by the one or more orchestration order components.

6. The method of claim 1 wherein the state information includes metadata indicative of at least one of a failure count or a warning count.

7. A system for managing order processing and fallout, the system comprising:
- at least one processor;
- a memory; and
- an order management server (OMS) that implements an electronic order management system, the order management server including the at least one processor and the memory, wherein the OMS is configured to process, in accordance to a plurality of orchestration plans, an order entity containing an order item, wherein each of the orchestration plans is functioning on one of a plurality of processing layers executed by the electronic order management system, respectively receive, from each of one or more orchestration order components associated with the orchestration plans, state information corresponding to a child order item contained in a child order entity, wherein the state information respectively received by each of the one or more orchestration order components is respectively reflected in an order component order item included within the one or more orchestration order components, and determine a current processing state for the order item contained in the order entity by aggregating the state information reflected in all of the order component order items included in the one or more order components of the plurality of orchestration plans existing in the plurality of processing layers, wherein aggregating the state information includes determining a sum of processing failures corresponding to the order item and the child order item existing in the plurality of processing layers, wherein the order entity contains a relational link identifier that establishes a relational dependency between the order item existing at an upper layer of the plurality of processing layers and the child order item existing on a lower layer of the plurality of processing layers, wherein the relational link identifier contained in the order entity includes one or more pieces of data that remain immutable such that a logical link between the order item and the child order item is preserved throughout a lifecycle of the order item and the child order item.

8. The system of claim 7 wherein the plurality of processing layers includes a customer layer, a service layer, and an activation layer.

9. The system of claim 8 wherein each of the plurality of processing layers includes one or more orchestration plans containing one or more orchestration order components.

10. The system of claim 8 wherein the child order entity is processed on a subsequent processing layer positioned hierarchically below the processing layer in the order management processing model.

11. The system of claim 7 wherein the child order entity is generated by the one or more orchestration order components.

12. The system of claim 7 wherein the state information includes metadata indicative of at least one of a failure count or a warning count.

13. A non-transitory computer readable medium having stored thereon executable instructions that when executed by a processor of a computer cause the computer to perform steps comprising:
- processing, in accordance to a plurality of orchestration plans, an order entity containing an order item, each of the orchestration plans is functioning on one of a plurality of processing layers executed by an electronic order management system;
- respectively receiving, from each of one or more orchestration order components associated with the orchestration plans, state information corresponding to a child order item contained in a child order entity, wherein the state information respectively received by each of the one or more orchestration order components is respectively reflected in an order component order item included within the one or more orchestration order components; and
- determining a current processing state for the order item contained in the order entity by aggregating the state information reflected in all of the order component order items included in the one or more order components of the plurality of orchestration plans existing in the plurality of processing layers, wherein aggregating the state information includes determining a sum of processing failures corresponding to the order item and the child order item existing in the plurality of processing layers, wherein the order entity contains a relational link identifier that establishes a relational dependency between the order item existing at an upper layer of the plurality of processing layers and the child order item existing on a lower layer of the plurality of processing layers, wherein the relational link identifier contained in the order entity includes one or more pieces of data that remain immutable such that a logical link between the order item and the child order item is preserved throughout a lifecycle of the order item and the child order item.

14. The computer readable medium of claim 13 wherein the plurality of processing layers includes a customer layer, a service layer, and an activation layer.

15. The computer readable medium of claim 14 wherein the child order entity is processed on a subsequent processing layer positioned hierarchically below the processing layer in the order management processing model.

16. The computer readable medium of claim 13 wherein the child order entity is generated by the one or more orchestration order components.

17. The computer readable medium of claim 13 wherein the state information includes metadata indicative of at least one of a failure count or a warning count.

* * * * *

UNITED STATES PATENT AND TRADEMARK OFFICE
CERTIFICATE OF CORRECTION

PATENT NO. : 10,424,005 B2
APPLICATION NO. : 14/700819
DATED : September 24, 2019
INVENTOR(S) : Corlett et al.

Page 1 of 1

It is certified that error appears in the above-identified patent and that said Letters Patent is hereby corrected as shown below:

In the Specification

In Column 8, Line 29, delete "that that" and insert -- that --, therefor.

In Column 10, Line 54, delete "components" and insert -- component's --, therefor.

In Column 12, Line 18, after "below" insert -- . --.

Signed and Sealed this
Eighth Day of September, 2020

Andrei Iancu
*Director of the United States Patent and Trademark Office*